Nov. 13, 1934.  H. SYNCK  1,980,835
HAY LOADER
Filed May 2, 1934
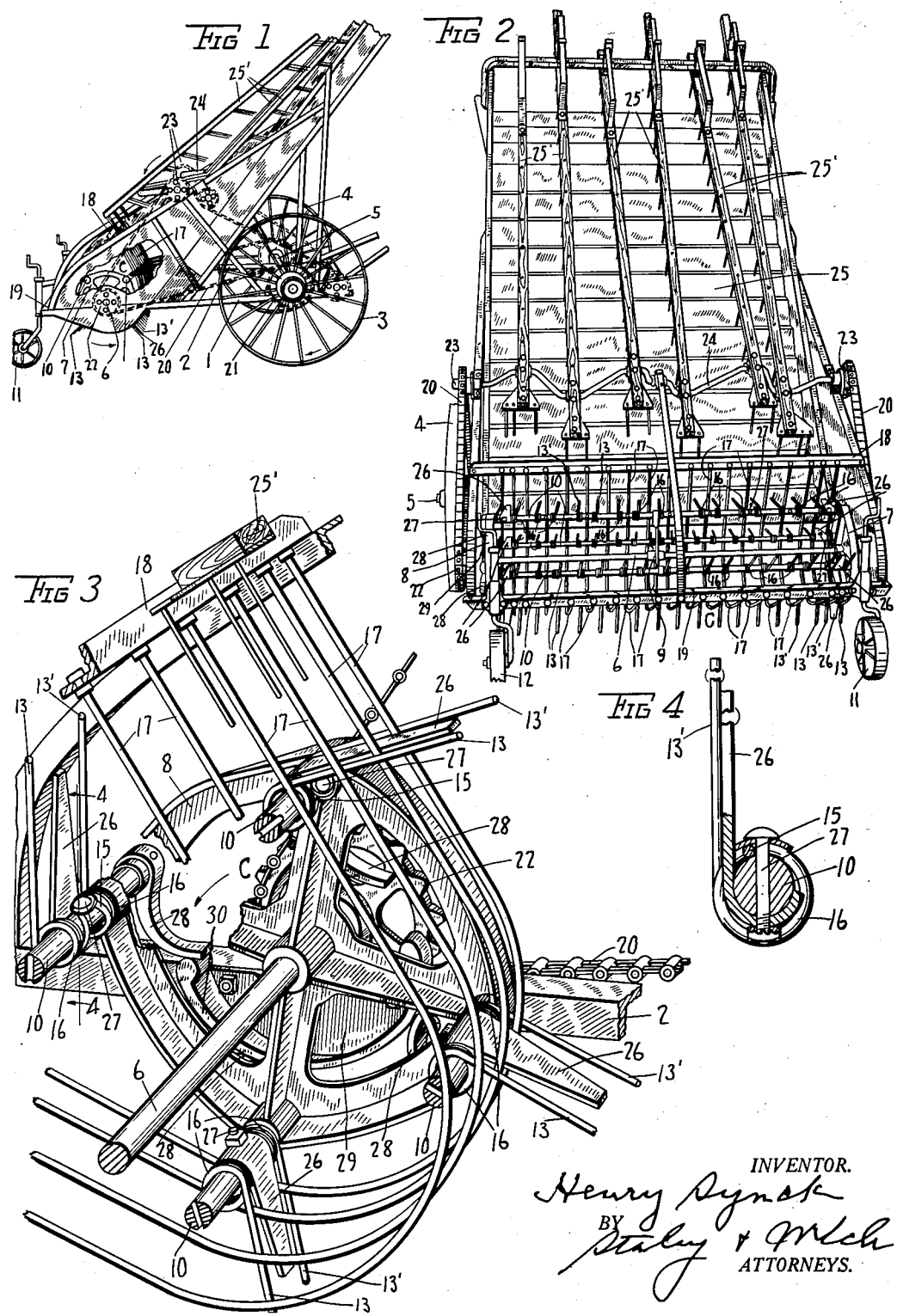
INVENTOR.
Henry Synck
BY
Staley & Welch
ATTORNEYS.

Patented Nov. 13, 1934

1,980,835

UNITED STATES PATENT OFFICE 1,980,835

HAY LOADER

Henry Synck, Coldwater, Ohio, assignor to The New Idea Spreader Company, Coldwater, Ohio, a corporation of Ohio Application May 2, 1934, Serial No. 723,508

7 Claims. (Cl. 56—364)

This invention relates to improvements in hay loaders of the type which comprises a rotary toothed raking cylinder, and it more particularly relates to improvements in the cylinder, especially to the raking elements of the cylinder.

The usual raking cylinder for this type of loader is equipped with a number of flexible teeth for raking the hay which are resilient enough to yield when they strike uneven portions of the meadow or obstructions. While raking cylinders of this type are effective for raking the hay, trouble is sometimes encountered at the ends of the cylinder due to the fact that under some conditions these flexible teeth are too weak to draw in the hay at those points of the cylinder. The difficulty thus encountered is due often to the fact that in practice swaths must be split with the cylinder which causes bunching of the hay, and also to the fact that where the hay has been windrowed it sometimes happens that the driver will get off of the windrow or drive to one side throwing all the work of drawing in the hay on to one end of the cylinder. Under these conditions the comparatively light flexible spring teeth are not stiff enough to bring the hay into the loader with the result that the machine clogs at the end of the cylinder.

One of the objects of this invention is to provide means for assisting the teeth at the ends of the cylinder in drawing in the hay under the conditions stated.

A further and more specific object of the invention is to provide additional raking elements located at the ends of the raking cylinder of a more rigid character than the flexible spring to assist the spring teeth in the operation of drawing in the hay at those points.

In the accompanying drawing:

Fig. 1 is a view in perspective looking at the side of a hay loader to the cylinder of which the improvements have been applied.

Fig. 2 is a view in perspective of the loader looking at the rear of the same; this figure being on a larger scale than Fig. 1.

Fig. 3 is an enlarged perspective view of a portion of the raking cylinder of a machine, looking in a rearward direction; some of the parts being shown in vertical section.

Fig. 4 is an enlarged section through one of the raking teeth shafts, the section being on the line 4—4 of Fig. 3.

Referring to the drawing, the principal frame members only will be mentioned, these being a pair of parallel spaced apart horizontally disposed members 1 and 2, Fig. 1. The major portion of the weight of the loader is carried on the two large wheels 3 and 4 which in their rotation on the dead axle 5 furnish power to turn the mechanisms by which the loading is brought about. A portion of the weight of the machine is also taken by the caster wheels 11 and 12.

The raking cylinder C is of the well known cylindrical type and consists of a shaft 6, end spiders 7 and 8, and a central spider 9. These spiders carry rock shafts 10 and on the rock shafts are the usual flexible spring raking teeth 13, 13'. The cylinder is carried in suitable bearings (not shown) secured to the frame members 1 and 2. The flexible spring raking teeth are preferably made in pairs, the teeth 13, 13' of a pair (Fig. 3) being the ends of a once straight rod preferably of spring steel at the center of which a U-bend is formed providing a bight portion 15 which continues to either side in a coil 16 of a suitable number of turns, the inner diameter of the coil being somewhat larger than the outer diameter of the rock shaft 10 upon which they are mounted. The teeth portions 13 and 13' are the remaining straight portions of the rod and extend tangentially from the outer end of a coil. The pairs of teeth are strung on the rock shaft 10 and secured in place by a bolt 27' shown in Fig. 4.

Following the usual practice, the raking cylinder is guarded by a series of fenders 17 each formed of a length of rod bent to an open, round bottom V-shape, the curvature being such that when in place that portion of the fender will be substantially concentrically disposed to the axis of rotation of the raking cylinder and is so placed with relation to the cylinder that the teeth project through and outwardly beyond the fenders. The upper end of each fender is secured to a frame member 18 (Figs. 2 and 3), while the other end is secured to another frame member 19 (Figs. 1 and 2).

The raking cylinder is driven from the drive wheels 3 and 4 by means of the sprocket chains indicated conventionally at 20, there being a chain on each side. A chain passes over a sprocket 21 (Fig. 1) clutched by a uni-directional clutch (not shown) to its drive wheel, and over a sprocket 22, one such sprocket being secured to each end of the cylinder shaft 6. The chain also passes over a sprocket 23 secured to the free ends of a crankshaft 24, the function of which will be mentioned later. The direction of rotation of the various elements is seen by arrows in Figs. 1 and 3.

As the raking cylinder rotates by reason of a forward movement of the loader, the teeth gather the hay and sweep it forwardly and upwardly towards an inclined loading deck 25 (Fig. 2 only), up which the hay is moved by the action of the push bars 25' of well known construction operated by the crank shaft 24.

In order to overcome the troublesome conditions heretofore explained due to the splitting of swaths or getting off of the windrows, there is provided means for assisting the raking action of the teeth at the ends of the cylinder. This means is preferably in the form of a series of relatively stiff, unyielding flat fingers 26, one of these fingers being located at the end of each rock shaft and between the teeth 13 and 13' of the last pair of teeth on the shaft. While it is preferable to use a substantially unyielding auxiliary raking finger, yet this finger, if desired, may be made with some resiliency without departing from the spirit of the invention, the important thing being that the finger should have a rigidity substantially greater than that of the flexible spring teeth 13 and 13' and of sufficient resistance to positively bring in the hay at the ends of the cylinder. One end of each finger is bent to conform to its corresponding shaft 10 and is secured thereto by the same bolt 27 (Fig. 4) which secures the pair of flexible spring teeth 13 and 13' with which the finger is associated. Due to the lack of any pronounced resiliency in the finger 26, the finger is made somewhat shorter than the teeth 13 and 13', so that there will be little or no danger of its striking obstructions or coming in contact with the ground, as the machine is always adjusted by raising or lowering the adjustable caster wheels 11 and 12 so that the raking teeth make but a relatively light contact with the ground.

The end pair of teeth 13, 13' on each rock shaft straddle two fenders instead of one fender as in the case of the intermediate pair of spring teeth, and at the ends of the cylinder the finger 26 passes between the two end fenders.

By attaching the added elements 26 to the shafts which carry the resilient raking teeth, these elements 26 will be permitted to withdraw at a given point from the hay simultaneously with the fingers 13, 13'. In this connection it should be explained that provision is made for rocking the shafts in a well known way so that the raking teeth and fingers will project radially from the cylinder at one portion of their movement about the axial center of the cylinder and then stand tangentially to the cylinder at a given point, i. e., the place where the hay is engaged by the push bars 25'. To that end, there is secured to one end of each rock shaft 10 a dog 28 which cooperates with the stationary cam 29 fixed in proper location to the inner surface of one of the main frame members such as the frame member 2, so that the circular portion 30 of the cam is concentrically disposed with relation to the axis of rotation of the cylinder. As the series of teeth approach the ground the dog on that shaft makes contact with the concentric portion 30 of the cam to swing and hold the teeth and fingers in a radial position so that the hay is positively moved and swept upwardly and forwardly until such time as appears desirable to change the radial position of the teeth. To accomplish this change, the concentric portion of the cam 30 is discontinued at a suitable point whereby the shaft 10 is rocked by the pressure of the hay and the teeth and fingers pass through the fenders to free them from the hay.

The fingers 26 may be stiff or practically unyielding or may have, as previously stated, some resiliency. The important thing in the construction of these fingers is that they have sufficient resistance to positively bring the raked hay into the machine. These stiff fingers act to prevent the resilient spring teeth from bending back under undue load in which event the cylinders would pass over the hay and fail to draw it in. It might be stated that a loader without being equipped with these stiff fingers operates properly when the loader is taking up hay in the windrow so long as the loader is driven straight over the windrow as in that case the ends of the cylinders have no particular work to do. When, however, the hay hangs out at the ends of the cylinder it requires positive action to bring it in and these relatively stiff fingers serve that purpose very effectively.

Having thus described my invention, I claim:

1. In a hay loader, a rotary transversely arranged raking device, a series of resilient spring raking teeth disposed throughout the length of said device, and a raking element of a more rigid character than said teeth carried by said device and cooperating with the teeth at at least one end of said device.

2. In a hay loader, a rotary raking device, a rock shaft carried by said device and extending transversely of the hay loader, a series of resilient spring raking teeth disposed throughout the length of said shaft, and a raking finger of a more rigid character than said teeth carried by said shaft and disposed adjacent the teeth at an end of said shaft.

3. In a hay loader, a rotary raking device, a rock shaft carried by said device and extending transversely of the hay loader, a series of resilient spring raking teeth disposed throughout the length of said shaft, and a raking finger of a more rigid character than said teeth carried by said shaft and disposed adjacent the teeth at an end of said shaft, said finger being shorter in length than said teeth.

4. In a hay loader, a rotary raking device arranged transversely of the loader, a plurality of series of spring raking teeth comprised in said device, and a plurality of raking elements of more rigid character than said teeth, one at least of said elements being arranged at each end of each series of teeth.

5. In a hay loader, a rotary raking device arranged transversely of the loader, a plurality of transversely arranged rock shafts comprised in said device, a series of spring raking teeth on each rock shaft, and a plurality of raking elements of more rigid character than said teeth carried by said rock shafts, one at least of said elements being arranged at each end of each series of teeth.

6. In a hay loader, a rotary raking device arranged transversely of the loader, a plurality of transversely arranged rock shafts comprised in said device, a series of spring raking teeth on each rock shaft, and a plurality of raking elements of more rigid character than said teeth carried by said rock shafts, one at least of said elements being arranged at each end of each series of teeth and between the last two teeth at each end of the series.

7. In a hay loader, an inclined deck, reciprocatory push bars arranged above said deck, a transversely-arranged raking cylinder at the lower end of said deck, a plurality of series of yieldable spring raking teeth carried by said cylinder, and raking fingers of a more rigid character than said teeth disposed at the ends of said cylinder.

HENRY SYNCK.